(12) United States Patent
Rathbun

(10) Patent No.: US 6,343,807 B1
(45) Date of Patent: Feb. 5, 2002

(54) MULTI-TRAVEL SUSPENSION FORK FOR CYCLES

(75) Inventor: James C. Rathbun, Burbank, CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/764,098

(22) Filed: Jan. 19, 2001

(51) Int. Cl.$^7$ ............................................... B62K 25/08
(52) U.S. Cl. ...................................... 280/276; 267/175
(58) Field of Search ............................... 267/249, 250, 267/175, 177; 280/279, 276, 277, 281.1, 283

(56) References Cited

U.S. PATENT DOCUMENTS

| | | | | |
|---|---|---|---|---|
| 2,475,774 A | * | 7/1949 | Benson | |
| 5,009,451 A | * | 4/1991 | Hayashi et al. | 280/724 |
| 5,284,352 A | * | 2/1994 | Chen | 280/276 |
| 5,350,185 A | * | 9/1994 | Robinson | 280/276 |
| 5,470,090 A | | 11/1995 | Stewart et al. | |
| 5,551,674 A | * | 9/1996 | Johnsen | 267/168 |
| 5,803,443 A | * | 9/1998 | Chang | 267/221 |
| 6,026,755 A | * | 2/2000 | Long | 108/147 |
| 6,105,988 A | * | 8/2000 | Turner et al. | 280/276 |

OTHER PUBLICATIONS

Rock Shox Psylo XC Owners Manual, Jun. 2000.
Rock Shox Psylo Race Owners Manual, Jun. 2000.
Rock Shox Judy XC, Rock Shox All, Bicycling Magazine, Jun. 2000.

* cited by examiner

Primary Examiner—Avraham H. Lerner
(74) Attorney, Agent, or Firm—Lawrence E. Laubscher

(57) ABSTRACT

A suspension fork for cycles includes an operating device mounted externally on a telescopic fork leg that permits the rider to selectively shorten or lengthen the extent of relative travel between the inner and outer tubular sections of the fork. Preferably, an operating knob or lever is coupled with a rotary cylinder contained within the hollow compression rod by a torsion overload spring, thereby to displace a stop dog between extended and retracted positions relative to the compression rod via a slot contained in the compression rod wall.

13 Claims, 8 Drawing Sheets

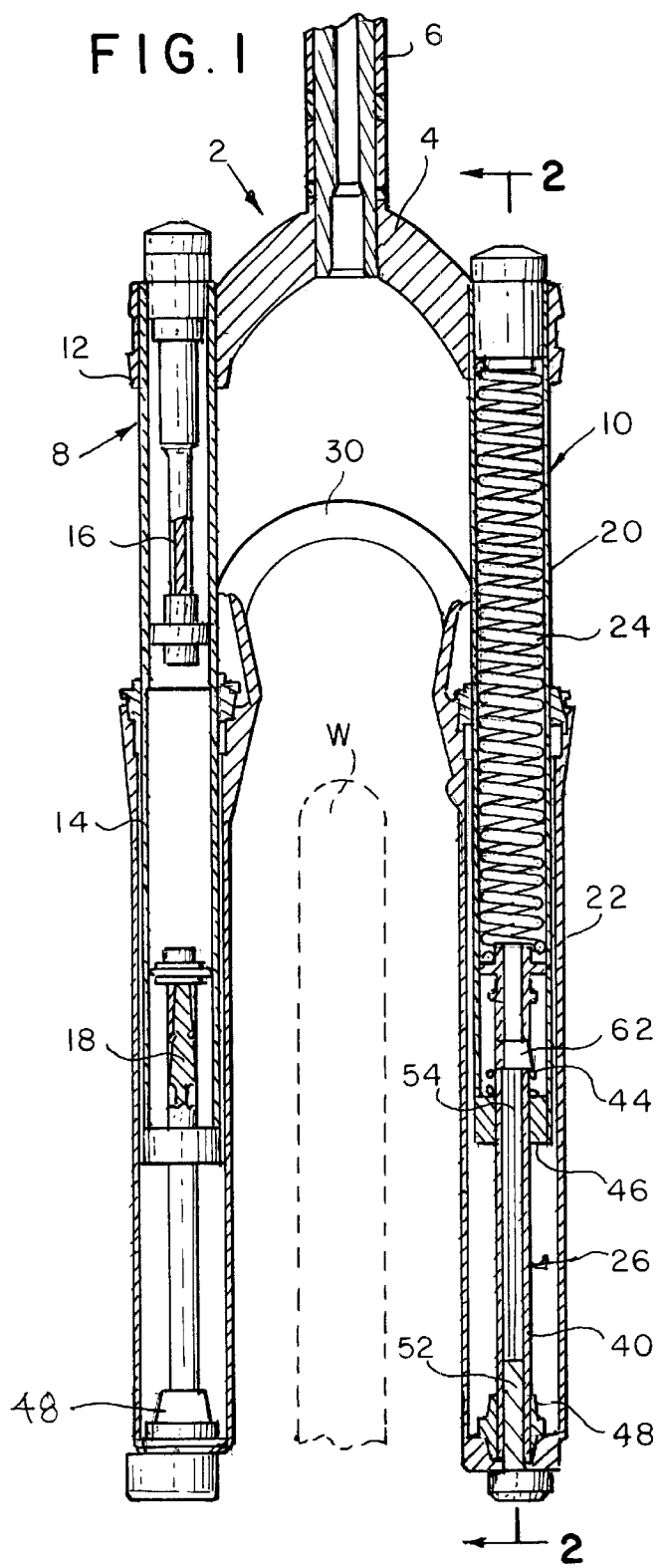
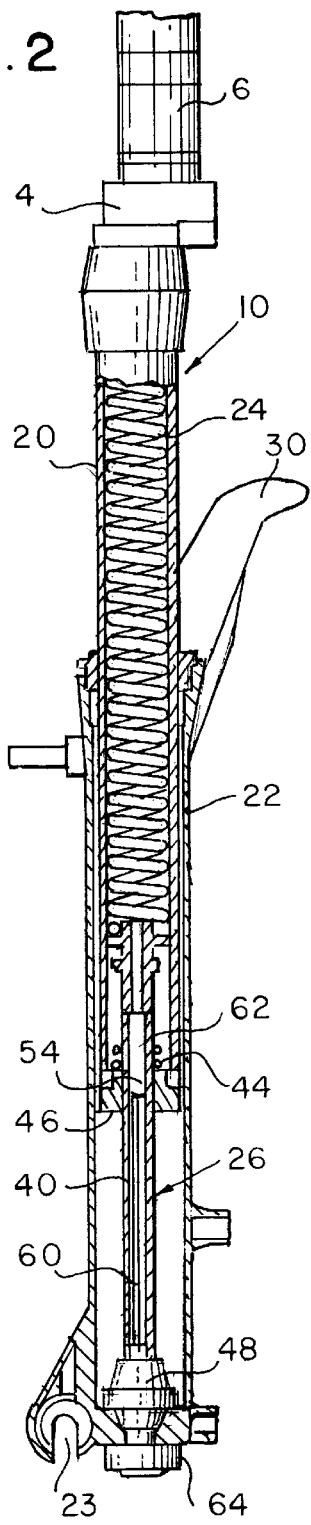

FIG. 7
FIG. 9
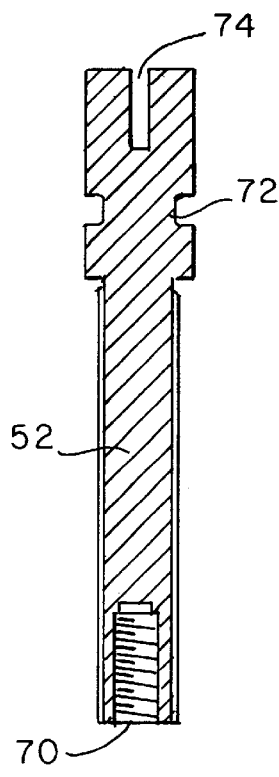
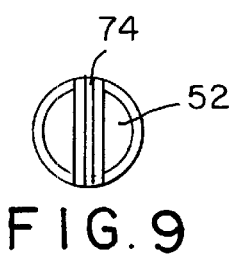
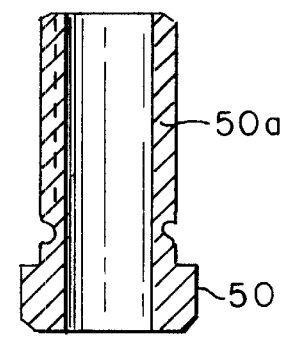
FIG. 10
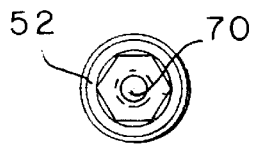
FIG. 8
FIG. 11
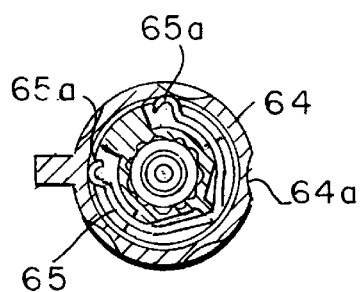
FIG. 6
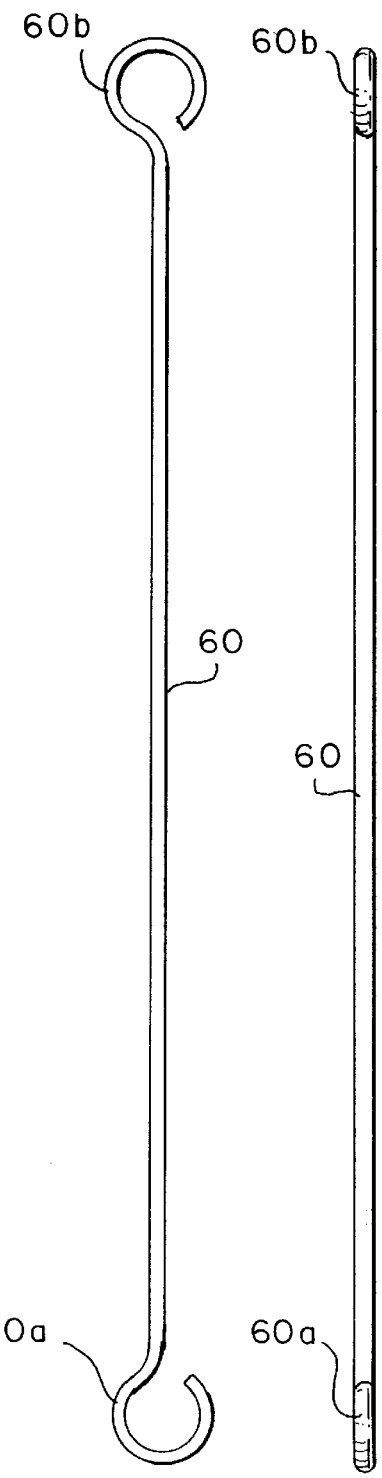
FIG. 12
FIG. 13

FIG. 16
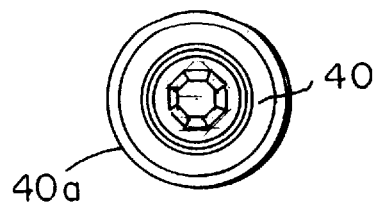
FIG. 14
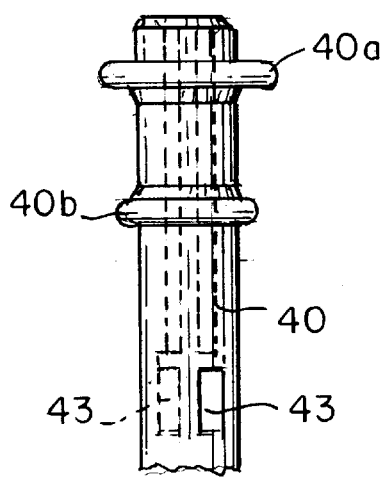
FIG. 15
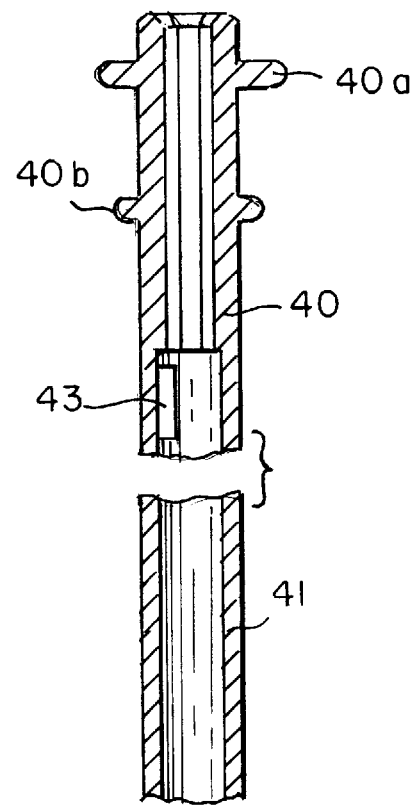
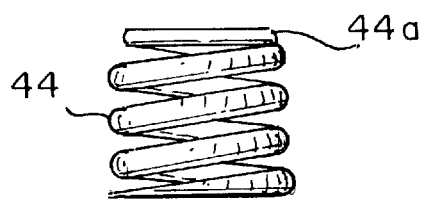
FIG. 17
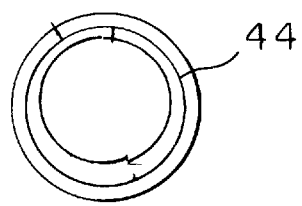
FIG. 18

FIG.26

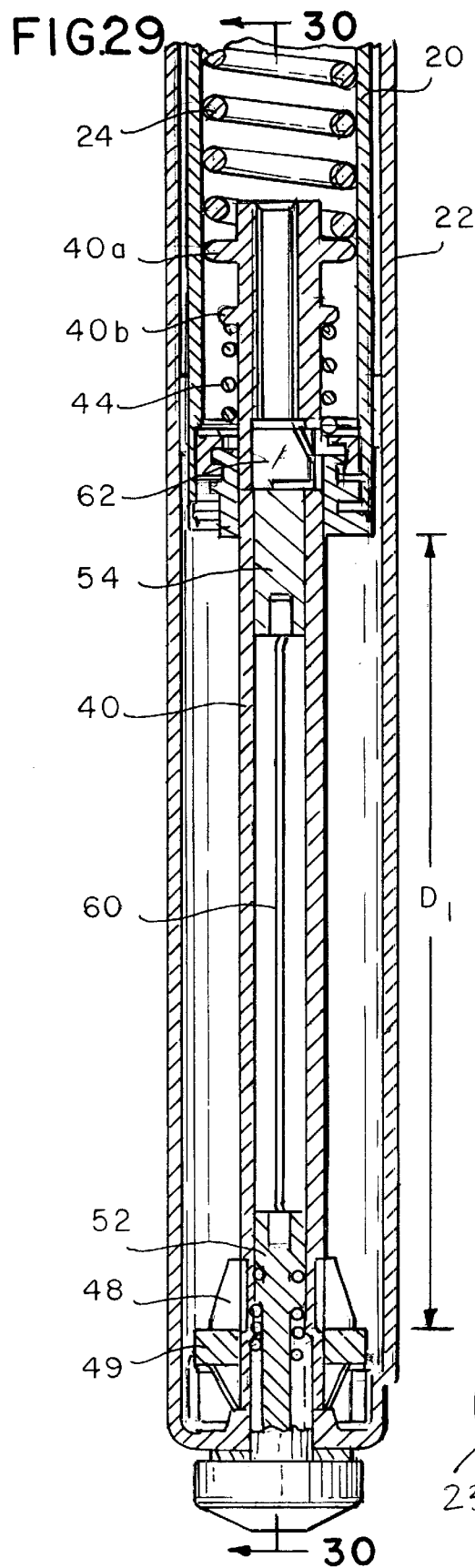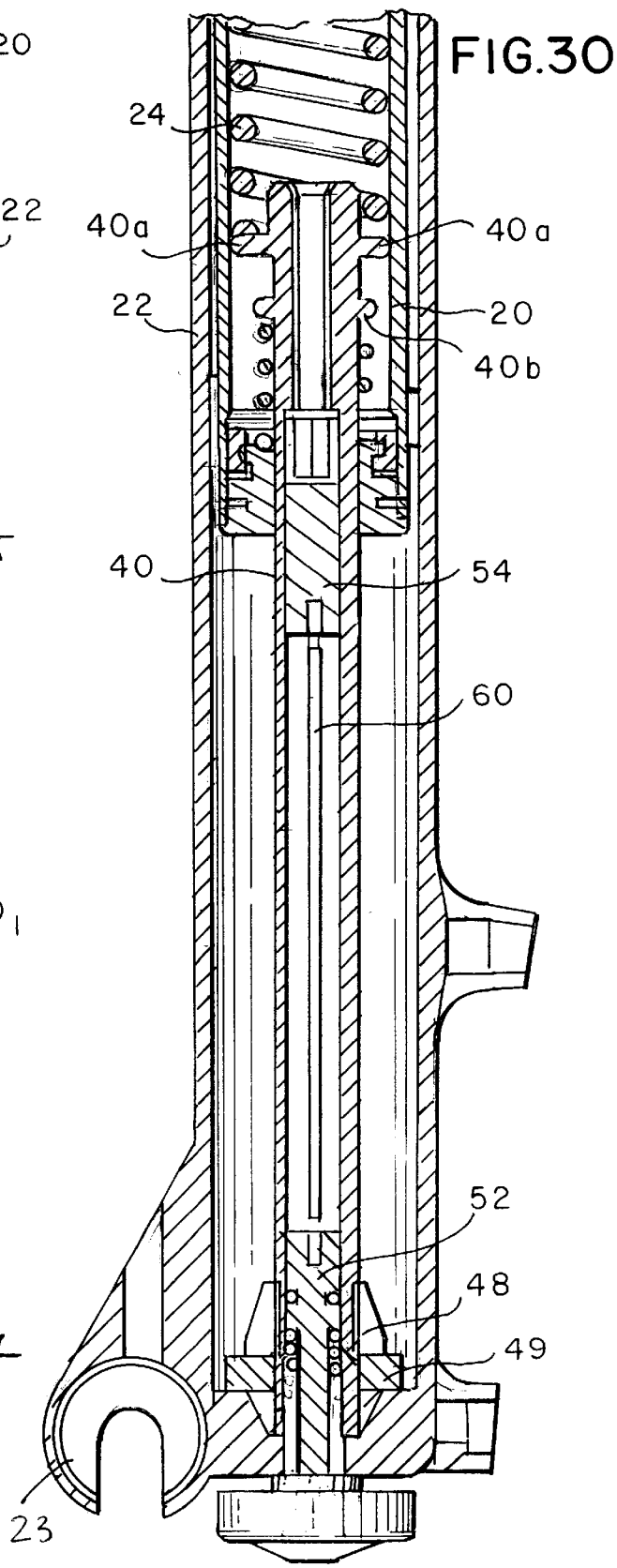

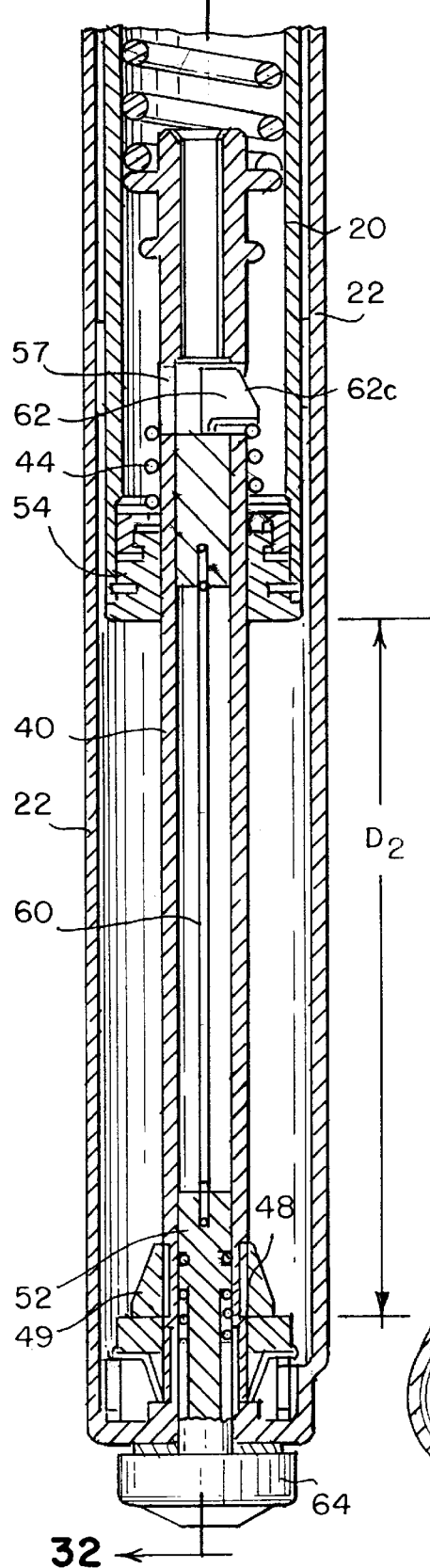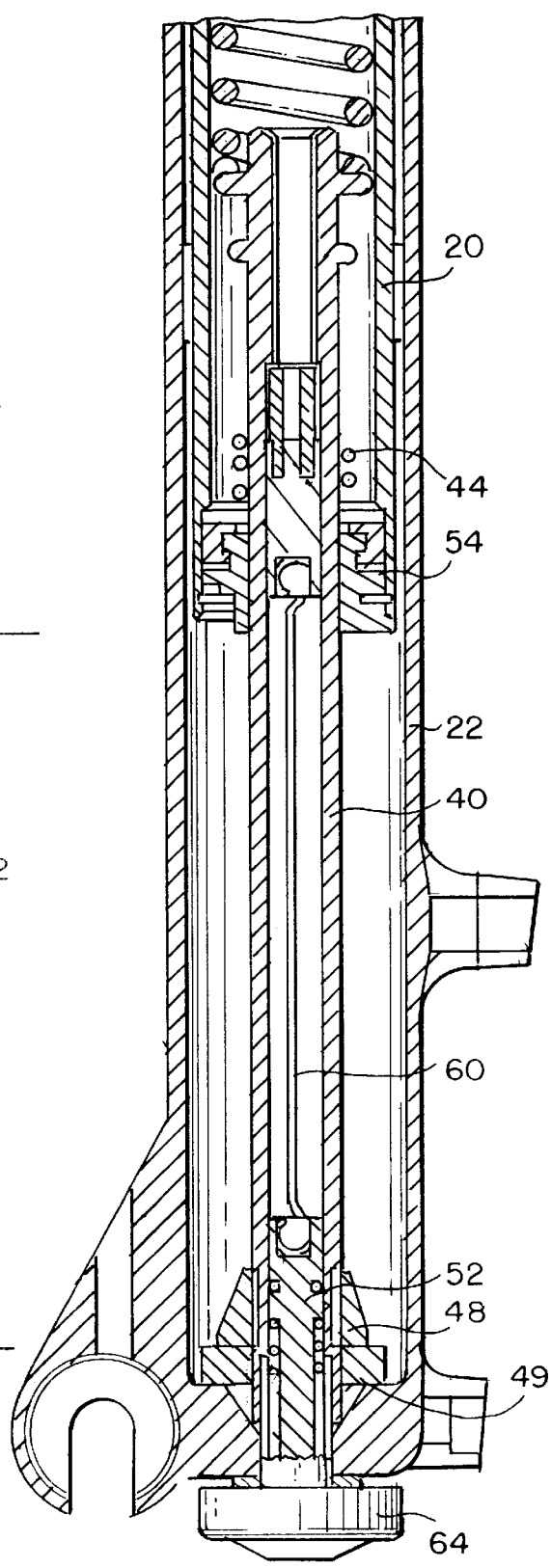

MULTI-TRAVEL SUSPENSION FORK FOR CYCLES

FIELD OF THE INVENTION

A suspension fork for cycles includes adjustment means operable by the rider externally of the fork for selectively controlling the extent of relative axial travel of the telescopic leg sections of the fork.

BACKGROUND OF THE INVENTION

BRIEF DESCRIPTION OF THE PRIOR ART

The adaptation of suspension elements to the front forks of bicycles has increased the functionality of the bicycle and the enjoyment thereof by the user by insulating the rider from the bumps or obstacles in the road or trail. Early suspension forks had only 50 mm of travel, which at the time seemed to be a great improvement. As riders adapted to the increased off-road abilities of bicycle due to the suspension fitted to the bicycle, they soon sought even more suspension travel to be able to attack more difficult terrain and at higher speeds.

As suspension travel increased, it became apparent that improved comfort and control riding rough or downhill terrain could be achieved with ever longer travel forks. However, it also became apparent that with this increased travel, there was a compromise in the ideal bicycle geometry or riding position for riding on level or uphill terrain. This left the rider with a need to choose between a suspension optimized with longer travel for rugged downhill terrain or somewhat shorter travel for efficiency on smoother and uphill terrain.

The first attempt to build a suspension fork that addressed this multi-travel need was taught by the Stewart, et al., U.S. Pat. No. 5,470,090. This invention allowed the user to assemble the same fork in two different configurations, one being a short travel version and one being a longer travel configuration. This allowed the rider to better optimize his fork to riding different terrain without having to buy two different forks or switch forks on the frame. However, this design did require considerable disassembly and re-assembly of the suspension fork to effect the change from long travel to short travel, which was not convenient or often utilized by the end user.

The next improvement in forks with multi-travel capabilities was the Rock Shox PSYLO fork. This improvement allowed the user to adjust the fork travel by turning a screw located inside the stanchion (inner leg). This used a screw type ramp mechanism to shorten or lengthen the fork travel within a range to better suit the particular terrain to be ridden. Although this method did not require considerable disassembly of the fork, which was a significant improvement, it did require the user to stop riding the bicycle, obtain tools and remove some elements of the fork to gain access to the adjusting mechanism and then replace them before continuing on.

The present invention was developed to provide a new improved suspension fork for cycles, such as bicycles and motorcycles, wherein the rider could utilize the clear advantages of a fork, the travel of which could be adjusted to best suit the particular terrain the rider encountered during the course of the ride. During many typical rides, many types of terrain and riding conditions are encountered and the potential existed for the need to change the travel characteristics of the fork several times even during the same ride. The key to product success was to allow the end user to adjust travel "on the fly" with on-off switch convenience. This needed to be accomplished by the rider out on the trail with no tools and no fork disassembly; as simple as a flip of a lever.

SUMMARY OF THE INVENTION

Accordingly, a primary object of the present invention is to provide a suspension fork for cycles including adjustment means operable by the cyclist externally of the fork for adjusting the relative length of travel between the telescopic sections of at least one leg of the suspension fork. Preferably an adjustment knob or lever is arranged at either the bottom or the top of the fork leg at a location readily accessible to the cyclist, whereby the travel adjustment is easily and positively accomplished without the need of any tools and/or any disassembly of the fork.

According to a more specific object of the invention, the compression rod that is contained within the telescopic sections of the leg and which cooperates with the compression spring to bias the sections apart toward an expanded condition is hollow and includes alternately retractable and extensible stop means that are operable externally of the fork leg. These stop means are arranged intermediate the first and second travel limiting means of the fork, whereby when the stop means are in the extended condition, the relative length of travel of the telescopic leg sections is shortened.

According to another object of the invention, the stop means includes at least one stop dog that is displaceable from a retracted position within the hollow compression rod to an extended position in which the stop dog extends partially outwardly of the compression rod via a slot contained in the wall thereof. Various types of operating means may be used for displacing the stop dog to its extended position, including wedge means, cam means, and rotary operating means.

According to the preferred embodiment of the invention, a pair of stop dogs extend outwardly via opposed slots contained in the compression rod. The stop dogs include longitudinally extending pivot shafts that extend within eccentrically arranged bores contained in one end of an inner cylindrical operating member that is rotatably mounted coaxially within the compression rod. According to an important feature of the invention, the operating lever or knob that is externally arranged on the upper or lower end of the fork is coupled to the cylindrical operating member via a torsion overload spring, thereby to achieve positive extension or retraction of the stop dogs. Preferably, the stop dogs are provided with angularly arranged surfaces that prevent the stop dogs from being caught on the end of the rebound spring or on the rebound spring capture means.

According to a further object of the invention, a set of sliding stop dogs is used to control the position of the stanchions relative to the outer assembly. The true advantage of this feature is to allow the user to have the benefit of a short travel fork for climbing and a long travel fork for descent all in one fork, accessed by at the mere flip of a lever. The addition of a torsion spring, between the lever and sliding dogs, allows for the travel to be set at any point in the stroke of the fork. Once set, the travel will be limited during the stroke or at the next stroke (depending upon the position selected). The particular execution of the travel adjustment means utilizes a switching adjustment lever at the bottom or the top of the leg of the suspension fork. By placing the adjustment knob at the top of the fork, and ever greater level of rider convenience is provided for switching travel length to meet varied terrain and riding conditions without the need for stopping or dismounting the bicycle.

BRIEF DESCRIPTION OF THE DRAWINGS

Other objects and advantages of the invention will become apparent from a study of the following specification when viewed in the light of the accompanying drawings, in which:

FIG. 1 is a sectional view taken of a bicycle front fork assembly including the present invention, and FIG. 2 is a sectional view taken along 2—2 of FIG. 1;

FIG. 6 is a sectional view illustrating the cooperation between the U-shaped detent spring and the adjustment knob of FIGS. 3–5;

FIG. 7 is a longitudinal sectional view taken through the lower operating member, and FIGS. 8 and 9 are bottom and top views of the lower inner operating member of FIG. 7;

FIGS. 10 and 11 are longitudinal sectional and bottom views, respectively, of the support housing for the lower inner operating member of FIG. 7;

FIGS. 12 and 13 are front and side elevation views, respectively, of the torsion spring member;

FIG. 14 is a detailed elevational view of the upper end of the compression rod,

FIG. 15 is a longitudinal sectional view of the upper end of the compression rod, and FIG. 16 is a top plan view of the compression rod;

FIGS. 17 and 18 are side elevation and top plan views, respectively, of the helical rebound spring;

FIGS. 25–28 are top diagrammatic illustrations of the manner of extension and withdrawal of the opposed stop dog members;

FIG. 29 is a longitudinal sectional view of the bottom portion of a telescopic fork leg according to the present invention, with the stop dog means being in the retracted condition, and FIG. 30 is a sectional view taken along line 30—30 of FIG. 29;

FIG. 31 is a longitudinal sectional view of the bottom portion of a fork leg with the stop dog in its radially outwardly extending position relative to the compression rod, and FIG. 32 is a sectional view taken along line 32—32 of FIG. 31;

DETAILED DESCRIPTION

Figure 3:
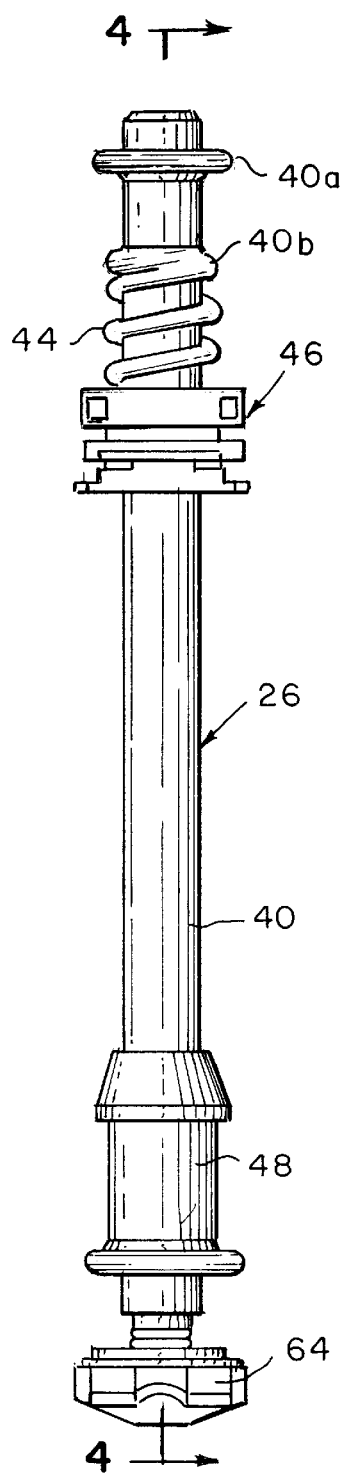
FIG. 3 is an elevational view of the compression rod assembly of the present invention.

Referring first more particularly to FIGS. 1 and 2, the front suspension fork 2 of the present invention includes a crown 4 that is connected with the steerer shaft 6 of the cycle, and a pair of telescopic legs 8 and 10 that extend downwardly from the ends of the crown fork, respectively. The left hand leg 8 includes inner and outer telescopic sections 12 and 14 that are connected at the remote ends with the crown 4 and with the axle of the wheel W of the cycle, shown in phantom. Needle valve means 16 and 18 control the damping characteristics of the fork leg 8 and form no part of the present invention.

The other leg 10 of the fork includes inner and outer telescopic sections 20 and 22 that are respectively connected at their remote ends with the crown member 4, and with the wheel axle via the axle catch portion 23. Arranged concentrically within the inner section 20 is a helical compression spring 24 that reacts with a tubular compression rod 26 that is connected at its lower end with the lower end of the outer leg section 22, thereby biasing the telescopic sections axially apart toward their normal expanded condition shown in FIG. 1. The upper ends of the outer sections 14 and 22 are connected by a conventional brake arch 30, as is known in the art.

Figure 4:
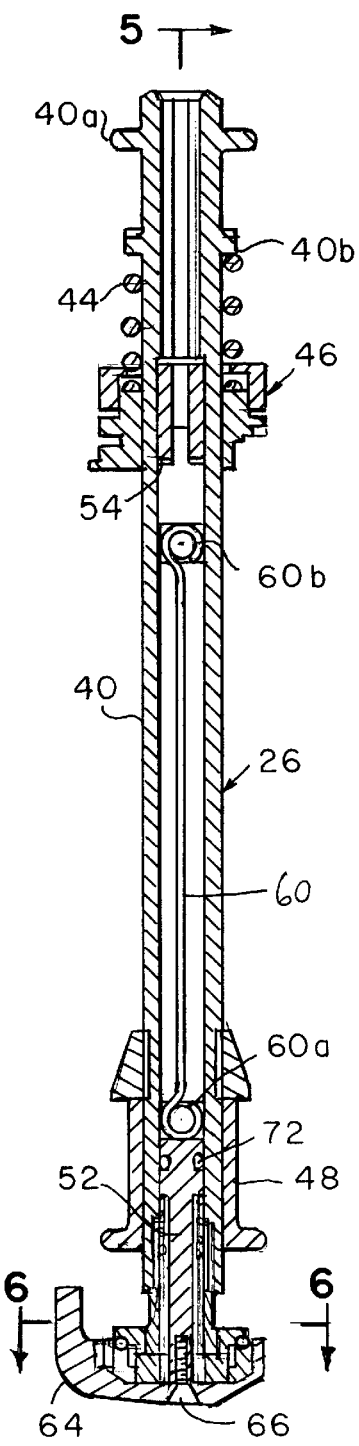
FIG. 4 is a sectional view taken along line 4—4 of FIG. 3.
Figure 5:
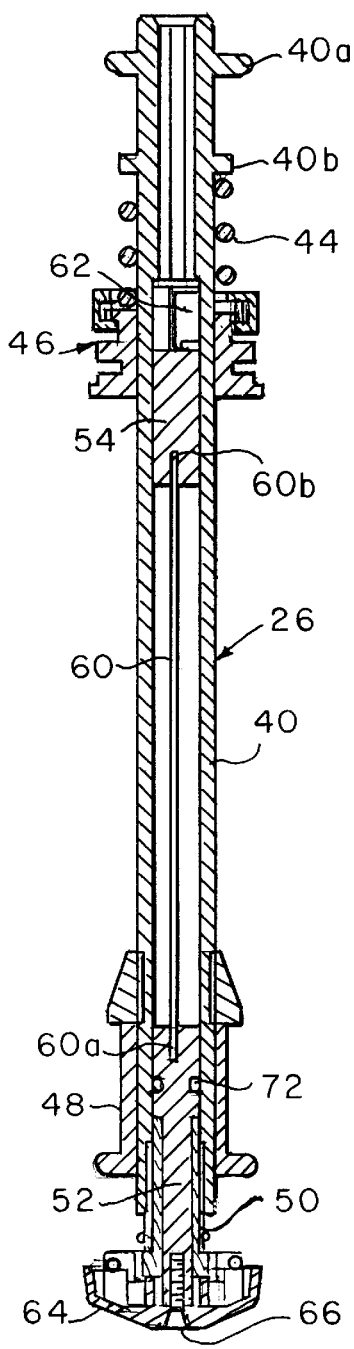
FIG. 5 is a sectional view taken along line 5—5 of FIG. 4.

As shown in greater detail in FIGS. 3–5, the compression rod assembly 26 includes a tubular compression rod 40 that is provided at its upper end with a pair of longitudinally spaced annular flanges 40a and 40b that react with the adjacent ends of the compression spring 24 and a helical rebound spring 44, respectively. The rebound spring 44 is captured at its lower end with an end closure assembly 46 that is connected with the lower end of the inner leg section 20, as shown in FIGS. 1 and 2. At the lower end of the compression rod assembly 26 is concentrically mounted an annular resilient bottom out bumper 48. At its lower end, the compression rod 40 is threadably connected with a tubular support shaft 50 in which is rotatably mounted the lower cylindrical operating member 52. Rotatably mounted within the counter bore contained in the compression rod 40, is an upper cylindrical operating member 54. The lower and upper cylindrical operating members are connected by a torsion spring 60 as will be described in greater detail below, a pair of stop dogs 62 are pivotally connected with the upper end of the upper inner operating member 54. An adjustment knob or lever 64 is connected with the lower end of the lower operating member 52 by the screw 66. As will be described below, rotation of the adjustment lever 64 in one direction produces rotation of the lower operating member 52 which is transmitted to the upper inner member 54 by the torsion spring 60. Thus, the upper cylindrical member 54 is rotated relative to the depression rod to cause displacement of the stop dogs 62 from their retracted positions within the compression rod to radially outwardly extend position via corresponding slots contained in the wall of the compression rod 40.

As shown in FIG. 6, the adjustment knob 64 includes a cylindrical inner surface that contains detent grooves that receive the bent end portions 65a of the generally U-shaped detent spring 65, thereby to define two positions of the adjusting knob 64 relative to the lower end of the outer leg section 22, as will be described in greater detail below.

Referring now to FIGS. 7–9, the lower inner operating member 52 comprises a cylinder container a threaded bore 70 at its lower end for receiving the screw 66 of the adjustment knob 64. At its upper end, the lower operating member contains an annular groove 72 for receiving the O-ring 74 shown in FIGS. 4 and 5. At its upper end, the lower inner operating member contains a diametrically extending slot 74 that receives the bent circular portion 60a at the lower end of the torsion spring 60, as shown in FIGS. 12 and 13. As shown in FIGS. 10 and 11, the lower inner member 52 rotates freely within the tubular support shaft 50, the upper portion 50a of which is threadably connected with the lower end of the compression rod 40.

Referring now to FIGS. 14–16, the tubular compression rod 40 contains a counter bore 41 for receiving the lower and upper inner operating members 52 and 54, respectively. At its upper end, the counter bore 41 contains a pair of radially extending slots 43 that receive the stop dogs 62, respectively.

As shown in FIGS. 17 and 18, the rebound spring 44 comprises a helical compression spring the remote end 44a of which is secured to the adjacent turn of the coil. At its lower end, the helical compression spring is captured by the end closure assembly 46 that is connected with the lower end of the inner leg section 20. Thus, the lower assembly 46 slides vertically upwardly and downwardly on the compression rod 40 in accordance with the displacement of the inner and outer leg sections 20 and 22 relative to each other.

Figure 22:
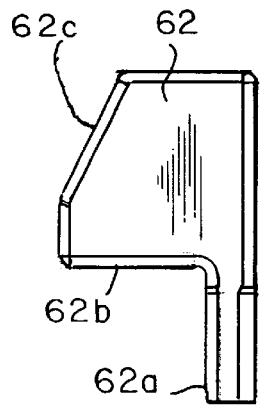
FIGS. 22, 23, and 24 are side elevation, end elevation, and bottom views, respectively, of one of the stop dog members.
Figure 23:
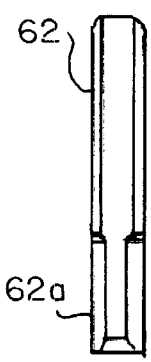
Figure 25:
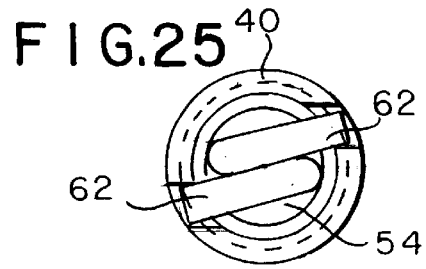
Figure 24:
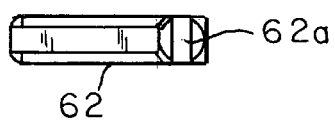
Figure 27:
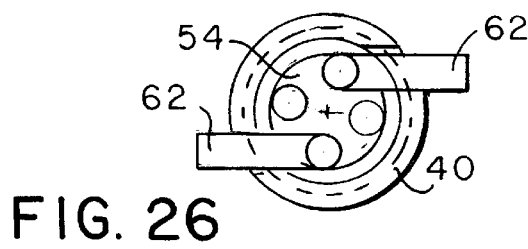
Figure 21:
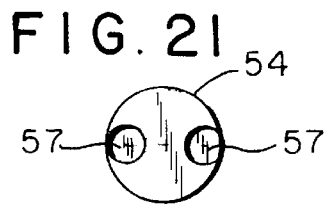
FIGS. 20 and 21 are side elevation and top plan views, respectively.
Figures 19, 20:
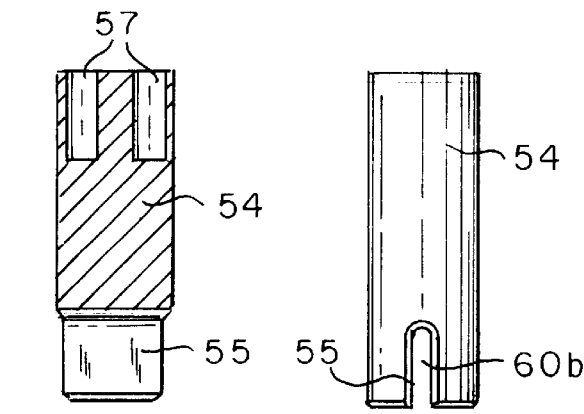
FIG. 19 is a transverse sectional view of the upper inner operating member.
Figure 28:
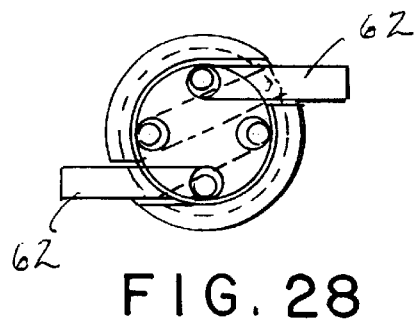

As shown in FIGS. 19–21, the upper inner operating member 54 comprises a cylinder that is provided at its lower end with a diametrically extending slot 55 that receives the bent circular upper portion 60b of the torsion rod 60. At its upper end, the upper inner operating member 54 contains a pair of eccentrically arranged bores 57 that rotatably receive the downwardly extending projecting portions 62a of the stop dogs 62 best shown in FIGS. 22–24. The lower edge portions of the stop dog 62 are provided with reversely inclined surfaces 62b (FIG. 22) that serve to prevent the stop dogs from being pivoted toward the retracted position at an inopportune time. Furthermore, the longitudinal edge of the stop dog includes inclines second surface 62c that serves to displace the stop dog to its retracted position within the compression rod during transition of the apparatus from the high travel to the low travel condition. As shown in FIGS. 26 and 27, when then upper inner cylinder 54 is rotated in the clockwise direction in FIG. 25, the stop dogs 62 are pivotally displaced to extend outwardly from the periphery of the compression rod 44. Rotation of the inner cylinder 54 in the counterclockwise direction relative to the compression rod 40 causes the stop dogs 62 to be retracted into the compression rod, as shown in FIG. 27.

Referring now to FIGS. 29 and 30, when the stop dogs 62 are in their retracted positions within the tubular compression rod 40, the upper end of the helical rebound spring 44 is in engagement with the lower stop flange 40b of the tubular compression rod 40. The inner leg section 20 is thus biased by compression spring 24 upwardly relative to the outer leg section 22. Thus, the lower end of the inner leg section 20 is spaced a given distance $D_1$ from the bottom out member 48 and its support washer 49.

As indicated in FIGS. 31 and 32, in order to reduce the length of travel of the inner leg section 20 relative to the outer leg section 22, the adjustment knob 64 is rotated through 90° as determined by the cooperation between the detent spring 65 and the dimpled recesses 64a. As the rotation of the lower inner operating member 52 is transmitted to the upper inner operating member 54 by the torsion spring 60, the stop dogs 62 are displaced outwardly owing to the rotation of the upper inner member 54 relative to the slots 57 contained in the stationary compression rod 40, whereupon the stop dogs are pivoted outwardly toward their extended positions. As shown in FIGS. 31 and 32, the upper end of the rebound spring 44 now cooperates with the lower surface 62b of the stop dog 62, whereby the length of travel $D_2$ between the lower end of the inner leg section 20 and the outer leg section 22, as determined by the bottom out bumper 48 and a support washer 49, is reduced.

The torsion overload spring serves two purposes. It prevents any damage to the mechanism if it is inadvertently turned in the wrong direction, and it provides preload for the dogs so that when the detent knob is turned to change the travel the dogs are preloaded to either retract or extend when the fork is pushed down. When changing from the higher travel to the lower travel, the dogs will try to come out in the middle of the spring or the inner leg end cap. The torsion spring allows the dogs to be pushed back into the compression rod by the cap and spring but still extend after the top-out spring has gone past. When changing from the lower travel to the higher travel, the dog is designed so that it will not disengage from the top-out spring until the rider pushes on the fork, again the torsion spring allows the dogs to be preloaded without disengaging prematurely.

The dog was designed with the angled surface 62c on the top side so that the spring and cap would slide down past the top-out spring and leg end cap when the fork is pushed down. The lower angled surface 62b prevents the dog from retracting until the fork is pushed down by the rider. This is a safety feature. If the fork was allowed to spring back into the higher travel position as soon as the detent knob was turned, it is possible that the rider while bending over to reach the knob at bottom of the fork would have their face close to some part of the bicycle would be hit and injured.

As indicated previously, the present invention is particularly suitable for use in the suspension fork of a bicycle, but it could also be used in connection with the suspension fork of a motorcycle. Furthermore, the invention could be included in a suspension fork having a single leg comprising a pair of telescopically displaceable sections.

Figure 33:
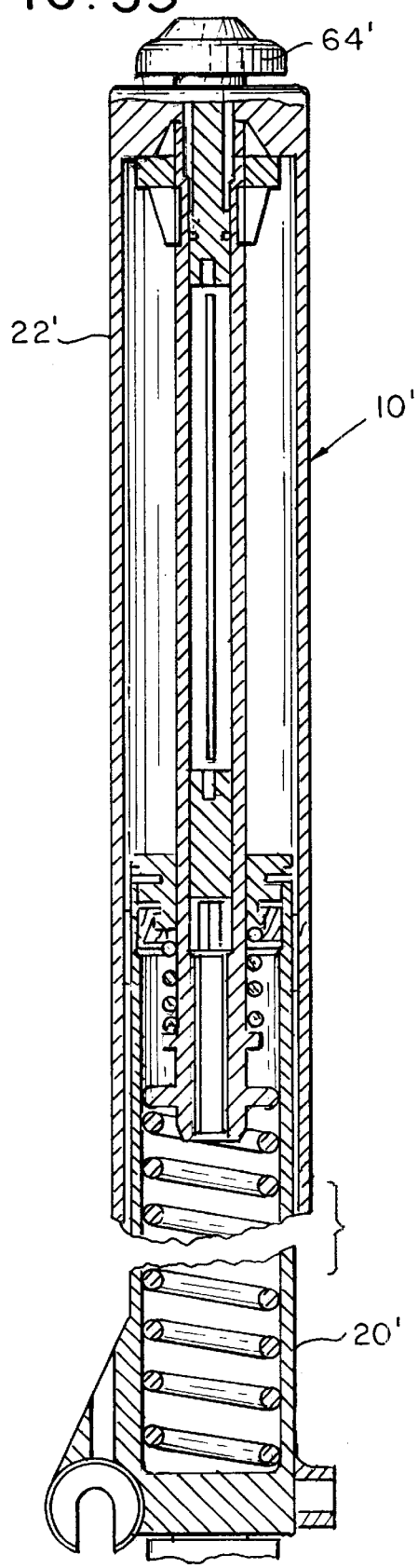
FIG. 33 is a sectional view of a modification of the telescopic fork leg of FIG. 2.

Furthermore, instead of providing the adjustment knob 64 at the bottom of the leg 10, in the embodiment of FIG. 33, the outer section 22 is reversed and arranged at the upper end of the leg relative to the inner section 20', whereby the adjustment knob 64' is arranged at the top of the leg.

Figure 34:
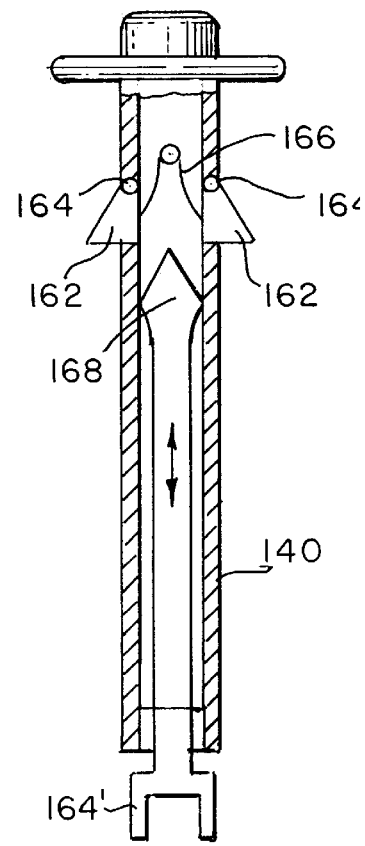
FIG. 34 is a somewhat diagrammatic sectional view of a second embodiment of the stop dog means.

Also, various other methods and means may be provided for displacing the stop dogs between their extended and retracted positions. To this end, as shown in FIG. 34, the stop dogs 162 could be pivotally connected by pivot means 164 for pivotal movement between retracted and expanded positions relative to the compression rod 140. In this case, the dogs are biased inwardly by spring means 166, and an axially displaceable wedge member 168 is operable by the adjusting knob 164 to displace the stop dogs 162 outwardly toward their radially extended positions. Alternately, the stop dogs could be mounted for sliding radial displacement relative to the slots in the compression rod within which the dogs are mounted.

While in accordance with the provisions of the Patent Statutes the preferred form and embodiment of the invention have been illustrated and described, it will be apparent to those skilled in the art that various changes may be made without deviating from the inventive concepts set forth above.

What is claimed is:

1. A front suspension fork for a cycle having a steerer shaft and a wheel that is rotatable about an axle, comprising:
   (a) at least one suspension fork leg including a pair of vertical telescopic tubular leg sections having remote first ends that are adapted for connection with the cycle steerer shaft and with the wheel axle, respectively;
   (b) a compression rod arranged concentrically within the outer one of the tubular leg sections, said compression rod having a first end connected with said first end of said outer leg section, said compression rod extending longitudinally along said outer leg section and having a second end that extends partially within the second end of the inner one of the leg sections;
   (c) helical compression spring means arranged concentrically within and extending longitudinally through said inner leg section, said compression spring means normally reacting between said compression rod and said first end of said inner tubular leg section to bias said leg sections axially apart;

(d) first travel limiting means limiting the extent of inward axial displacement of said inner leg section toward a collapsed position relative to the outer leg section;

(e) second travel limiting means limiting the extent of outward axial displacement of said inner leg section toward a first expanded position relative to said outer leg section, thereby to define a first relative travel distance ($D_1$) between said leg sections;

(f) normally de-activated third travel limiting means arranged between said first and second travel limiting means, said third travel limiting means being operable to an activated condition to limit the extent of outward displacement of said inner leg section toward a second expanded position relative to said outer leg section, thereby to define a second relative travel distance ($D_2$) between said leg sections that is shorter than said first relative travel distance; and (g) operating means arranged externally of said leg sections for selectively activating and de-activating said third travel limiting means.

2. A front suspension fork as defined in claim 1, wherein said inner fork leg section is adapted for connection at its upper end with the cycle steerer shaft, and the lower end of the outer leg section is adapted for connection with the wheel axle.

3. A front suspension fork as defined in claim 1, wherein said outer fork leg section is adapted for connection at its upper end with the steerer shaft, and the lower end of the inner leg section is adapted for connection with the wheel axle.

4. A front suspension fork as defined in claim 1, wherein said first travel limiting means includes bottom out bumper means connected within said first end of said outer leg section, said bottom out bumper means being arranged for engagement by said second end of said inner leg section; and further wherein said second limiting means comprises:

(a) an annular flange carried by said compression rod second end; and (b) rebound means carried by said second end of said inner leg section.

5. A front suspension fork as defined in claim 4, wherein said rebound means includes a rebound compression spring arranged concentrically about said compression rod, said rebound spring means being connected with and carried by said inner leg section second end.

6. A front suspension fork as defined in claim 5, wherein said third travel limiting means comprises at least one stop dog connected with said compression rod for displacement between extended and retracted positions when said third travel limiting means is in its activated and de-activated conditions, respectively.

7. A front suspension fork as defined in claim 6, wherein said compression rod comprises a hollow tubular member containing a radial slot through which said stop dog radially extends when said third travel limiting means is in the activated condition.

8. A front suspension fork as defined in claim 7, wherein said third travel limiting means further includes a cylindrical inner operating member rotatably mounted within said tubular compression rod, said dog being pivotally connected with said inner operating member for pivotal movement about a longitudinal pivot axis that is eccentric to the longitudinal axis of rotation of said inner operating member.

9. A front suspension fork as defined in claim 8, wherein said operating means for operating said third travel limiting means includes an adjustment knob rotatably connected with said first end of said outer fork leg section for rotation about the longitudinal axis thereof, and a torsion spring connected between said adjustment knob on said cylindrical inner operating member.

10. A front suspension fork as defined in claim 9, wherein said stop dog includes a longitudinal projection that defines said pivot axis, said projection extending within a corresponding bore contained in one end of said cylindrical member.

11. A front suspension fork as defined in claim 10, wherein said stop dog includes adjacent said projection an inclined transverse retaining surface that prevents displacement of said stop dog toward its retracted position until the rider displaces said leg sections slightly axially together toward the collapsed condition.

12. A front suspension fork as defined in claim 11, wherein said stop dog includes an inclined longitudinal surface arranged for engagement by said rebound compression spring to displace said stop member toward the retracted position relative to said compression rod.

13. A front suspension fork as defined in claim 5, wherein said third travel limiting means includes a pair of stop members mounted for radial displacement on corresponding slots contained on said compression rod, spring means biasing said stop members toward the retracted position relative to said compression rod, and axially displaceable wedge operating members radially outwardly toward said expanded condition.

* * * * *